(No Model.)
M. BOUSE.
CULTIVATOR.
No. 383,094. Patented May 22, 1888.
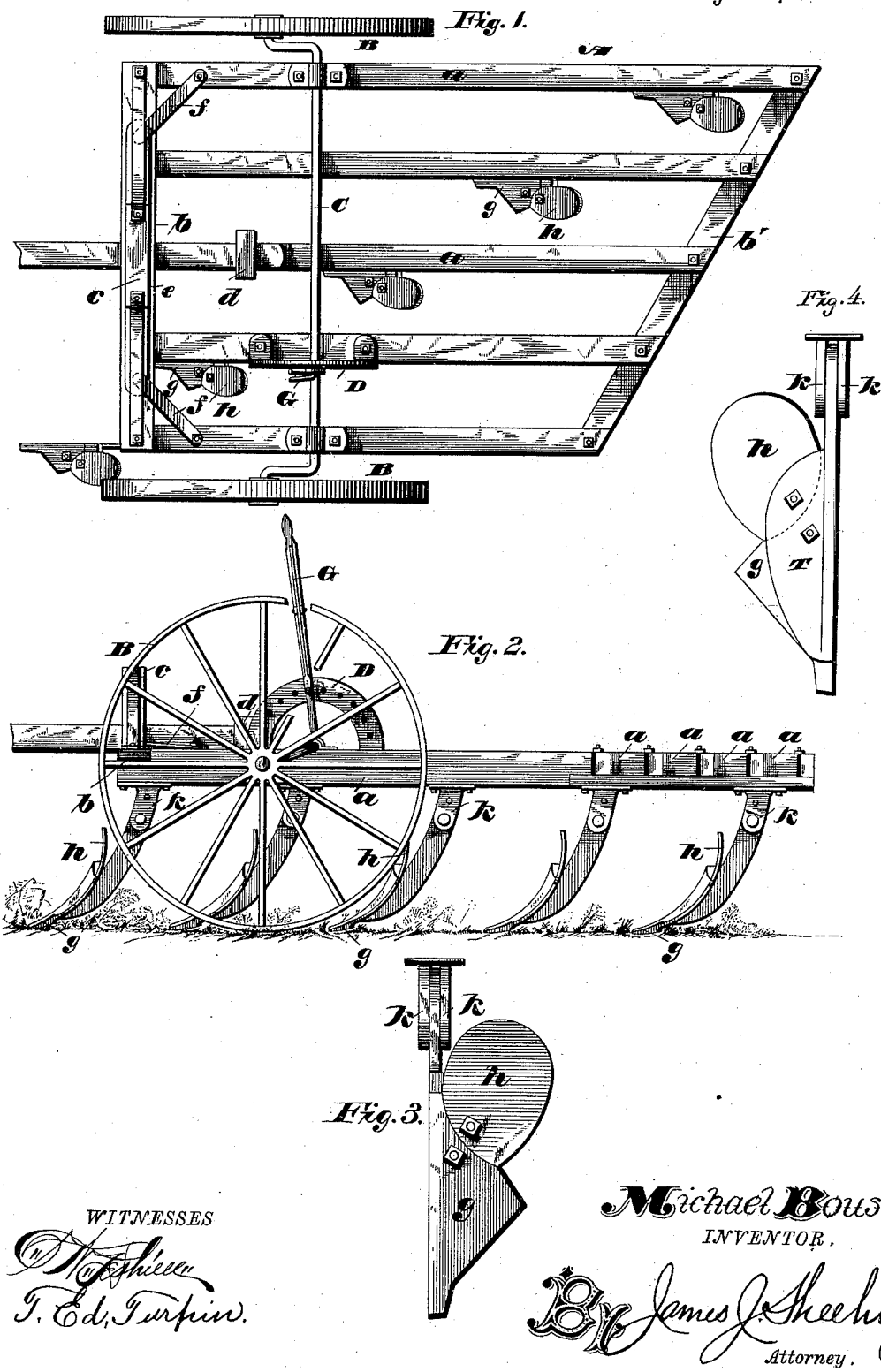
WITNESSES
Michael Bouse.
INVENTOR.
By James J. Sheehy
Attorney.

UNITED STATES PATENT OFFICE.

MICHAEL BOUSE, OF WILMOT, INDIANA.

CULTIVATOR.

SPECIFICATION forming part of Letters Patent No. 383,094, dated May 22, 1888.

Application filed November 19, 1887. Serial No. 255,610. (No model.)

*To all whom it may concern:*

Be it known that I, MICHAEL BOUSE, a citizen of the United States, residing at Wilmot, in the county of Noble and State of Indiana, have invented certain new and useful Improvements in Cultivators; and I do declare the following to be a full, clear, and exact description of the invention, such as will enable others skilled in the art to which it appertains to make and use the same.

This invention relates to cultivators; and it consists in the novel construction, hereinafter specified and claimed, by which the position of the plows and consequent depth of furrow, may be regulated by raising or depressing the frame to which they are attached.

The invention will be fully understood from the following description and claim, when taken in connection with the annexed drawings, in which—

Figure 1 is a plan view of my improved gang-plow. Fig. 2 is a side elevation of the same, and Fig. 3 is a front view of one of the plows detached. Fig. 4 is a rear view of the same.

Referring to the said drawings by letter, A designates a frame, which is preferably oblique at its rear end, and is formed of longitudinal bars $b$ and end bars, $b'$. The front bar, $b$, is provided with a tongue support or holder, $c$, resting upon a plate, $e$, secured in position on the bar by screws or bolts and by a raised bar, $d$, which is screwed or otherwise attached to the bar $a$, as shown. Diagonal braces $f$ are also arranged upon the frame extending from the plate $e$ to the side bars of the frame at an angle of about forty-five degrees.

B indicates the wheels, and C the axle, of a sulky-cultivator. Said axle is bent upward in the form of a crank-axle of a straddle-row cultivator, and has its bearings upon the surface of the side bars of frame A, as represented.

D indicates a perforated segment secured to a longitudinal bar, $a$, in the manner shown.

G represents a spring-lever of the usual form. The lower end is rigidly secured to the axle. A driver's seat is preferably arranged on the frame upon the middle longitudinal bar. The lever is provided with a holding-pin, which engages a perforation in the segment, and also a releasing-spring.

The plows are made in a form substantially as shown in Figs. 3 and 4, the standards having formed thereon the laterally-extending attaching-flange T, which is provided with transverse apertures. The wing $h$ is also provided with a perforation, and is designed to be secured by means of a bolt to the attaching-flange of the standard. $g$ indicates the point of the plow, which is so formed as to engage the forward edge of the wing $h$ and bear upon the said flange and standard, where it is also secured by a bolt flush with the said wing. The standard is pivoted to pendent arms $k$, and is provided with a break-pin. The plows are preferably arranged in a diagonal line, as shown on Fig. 4, to which the mold-board is bolted.

To operate my device, I release the holding-pin from its bearing in the segment and move the lever G backward or forward, as may be desired, to secure the desired position of the plows. This movement raises or depresses the entire frame, as the operator may wish, and when the proper altitude is reached the holding-pin of the spring-lever enters a perforation in the segment and makes the frame secure in that position.

Having described my invention, what I claim is—

In a plow substantially as described, the combination, with the jointed standard having the attaching-flange T formed thereon and provided with apertures, the wing $h$, and the point $g$, of the form shown, respectively secured to the said flange flush with each other, substantially as specified.

In testimony whereof I affix my signature in presence of two witnesses.

MICHAEL BOUSE.

Witnesses:
GEORGE S. BOUSE,
JOSEPH H. DEBRALAS.